US008665693B1

(12) United States Patent
Cheng et al.

(10) Patent No.: US 8,665,693 B1
(45) Date of Patent: Mar. 4, 2014

(54) UPLINK SINGLE CARRIER FREQUENCY DIVISION MULTIPLE ACCESS MULTIPLE-INPUT MULTIPLE-OUTPUT SOFT INTERFERENCE CANCELLATION RECEIVER

(75) Inventors: Shi Cheng, Sunnyvale, CA (US); Ravi Narasimhan, Los Altos, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 156 days.

(21) Appl. No.: 13/212,572

(22) Filed: Aug. 18, 2011

(51) Int. Cl.
*H04J 9/00* (2006.01)

(52) U.S. Cl.
USPC ............ 370/204; 370/210; 375/260; 375/346

(58) Field of Classification Search
USPC .......... 370/204, 210; 375/260, 267, 346, 347, 375/349
See application file for complete search history.

(56) References Cited

U.S. PATENT DOCUMENTS

| | | | |
|---|---|---|---|
| 7,386,057 B2 * | 6/2008 | Ito et al. ........................ | 375/267 |
| 8,199,034 B2 * | 6/2012 | Salvekar et al. ................ | 341/50 |
| 8,416,674 B2 * | 4/2013 | Lee et al. ....................... | 370/204 |
| 2002/0122510 A1 * | 9/2002 | Yakhnich et al. ............. | 375/342 |
| 2007/0140105 A1 * | 6/2007 | Coon ............................. | 370/208 |
| 2012/0045024 A1 * | 2/2012 | Cui et al. ....................... | 375/341 |

OTHER PUBLICATIONS

Ariyavisitakul, Turbo Space-Time Processing to Improve Wireless Channel Cpacity, IEEE Transactions on Communications, vol. 48, No. 8, Aug. 2000.
Berardinelli et al., Improved SC-FDMA Performance by Turbo Equalization in UTRA LTE Uplink, IEEE, 2008, p. 2557.
Berardinelli et al., Turbo Receivers for Single User MIMO LTE-A Uplink, IEEE 2009, p. 1.
Bittner et al., Low Complexity Soft Interference Cancellation for MIMO-Systems, IEEE 2006, p. 1993.
Dai et al., Downlink Capacity of Interference-Limited MIMO Systems with Joint Detection, IEEE Transactions on Wireless Communications, vol. 3, No. 2, Mar. 2004.
Laot et al., LOw-Complexity MMSE Turbo Equalization: A Possible Solution for EDGE, IEEE Transactions on Wireless Communications, vol. 4, No. 3, May 2005.
Pan et al., Practical Soft-Sic DEtection for MIMO SC-FDMA System with Co-Channel Interference, IEEE 2010.
Sellathurai et al., Turbo-Blast for Wireless Communications: Therory and Experiments, IEEE Transactions on Signal Processing, vol. 50, No. 10, Oct. 2002.
Wubben et al., MMSE Extension of V-Blast based on Sorted QR Decomposition, VCT Fall 2003.

\* cited by examiner

*Primary Examiner* — Alvin Zhu
(74) *Attorney, Agent, or Firm* — Turocy & Watson, LLP

(57) ABSTRACT

A system and method are provided for Soft Interference Cancellation (SIC) in receiving Single Carrier Frequency Division Multiple Access (SC-FDMA) Multiple-Input Multiple Output (MIMO) signals. A receiver with Mr antennas accepts multicarrier signals transmitted simultaneously, with N overlapping carrier frequencies. The receiver removes a cyclic prefix (CP), and fast Fourier transforms (FFT) the multicarrier signal from each antenna, supplying Mr number of N-tone signals y. Using either parallel SIC (P-SIC) or successive SIC (S-SIC), interference is canceled in each of the Mr signals, and soft symbols are supplied for each of U layers. Interference is canceled using the P-SIC process by parallel processing the U layers in an i-th iteration, in response to feedback from an (i−1)th iteration. Alternatively, interference is canceled using the S-SIC process by sequentially processing the U layers in an i-th iteration, in the order of $u_0$, $u_1, \ldots, u_{U-1}$, using feedback generated from previously processed layers.

23 Claims, 5 Drawing Sheets

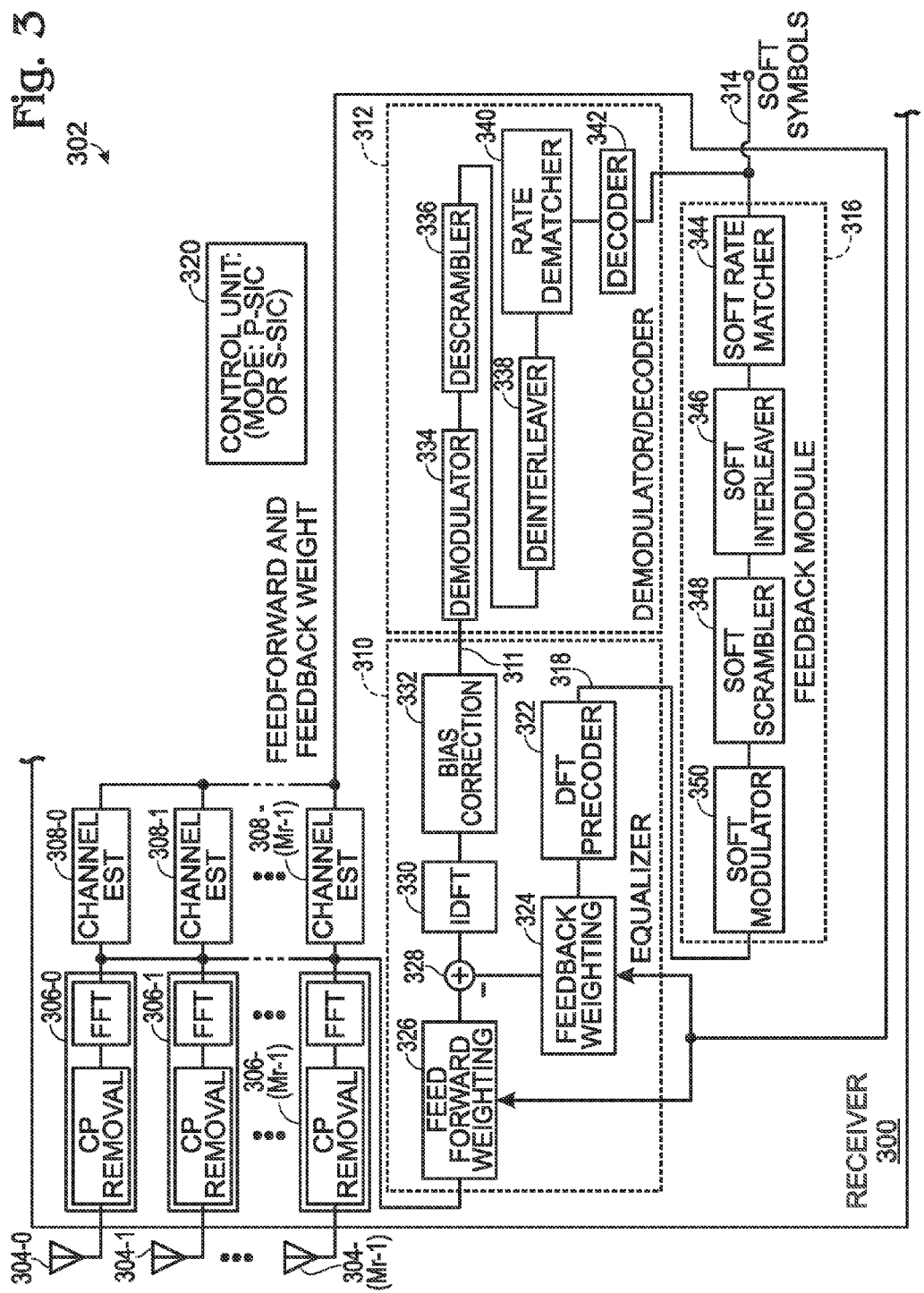

UPLINK SINGLE CARRIER FREQUENCY DIVISION MULTIPLE ACCESS MULTIPLE-INPUT MULTIPLE-OUTPUT SOFT INTERFERENCE CANCELLATION RECEIVER

BACKGROUND OF THE INVENTION

1. Field of the Invention

This invention generally relates to Single Carrier Frequency Division Multiple Access (SC-FDMA) Multiple-Input Multiple-Output (MIMO) communications and, more particularly, to soft interference cancellation (SIC) using either a serial or parallel channel equalization process.

2. Description of the Related Art

UL: Uplink
LTE: Long Term Evolution (3GPP term for next-generation cellular standard)
OFDMA: Orthogonal Frequency Division Multiple Access
SC-FDMA: Single Carrier Frequency Division Multiple Access
MIMO: Multiple-Input Multiple-Output
MU-MIMO: Multi-user Multiple Input Multiple Output
SU-MIMO: Single-user Multiple Input Multiple Output
SISO: Single Input Single Output
SIMO: Single Input Multiple Output
SIC: Soft Interference Cancellation
TO: Timing Offset
ACK: Acknowledgement
NACK: Negative Acknowledgement
DTX: Discontinued Transmission
CFO: Carrier Frequency Offset
AWGN: Additive White Gaussian Noise
eNodeB: Enhanced NodeB (LTE base station)
UE: User Equipment
UCI: Uplink Control Information
RB: Resource Block LTE and LTE-A use single-carrier frequency division multiple access as their uplink transmission technology. In LTE, multiple users can be spatially multiplexed on the same frequency-time resources, with each user sending a single spatial stream (MU-MIMO). In addition to this, LTE-A also supports SU-MIMO. Each user can send up to multiple spatial streams through its multiple transmit antennas.

FIG. 1 is a diagram depicting a Multiuser MIMO (MU-MIMO) wireless communication system (prior art). Multiple users can transmit data simultaneously at the same frequency to a multi-antenna base station, resulting in increased aggregate cell throughput. There is a need to decouple data streams from different users via MU-MIMO equalization, which requires MU-MIMO channel estimation. SU-MIMO (not shown) is similar except that a single user transmits via multiple antennas.

SC-FDMA is a multi-user version of a single carrier frequency domain multiplexing modulation scheme. SC-FDMA can be viewed as a linearly precoded OFDMA scheme, henceforth LP-OFDMA. Or, it can be viewed as a single carrier multiple access scheme. Just like in OFDM, guard intervals with cyclic repetition are introduced between blocks of symbols to efficiently eliminate time spreading (caused by multi-path propagation) among the blocks. In OFDM, a FFT is applied on the receiver side on each block of symbols, and inverse FFT (IFFT) on the transmitter side. In SC-FDMA, both FFT and IFFT are applied on the transmitter side, and also on the receiver side.

In OFDM as well as SC-FDMA, equalization is achieved on the receiver side after the FFT calculation, by multiplying each Fourier coefficient by a complex number. Thus, frequency-selective fading and phase distortion can be combated. The advantage is that FFT and frequency domain equalization requires less computation power than conventional time-domain equalization.

In MIMO systems, a transmitter sends multiple streams by multiple transmit antennas. The transmit streams go through a matrix channel which consists of all paths between the transmit antennas at the transmitter and receive antennas at the receiver. Then, the receiver gets the received signal vectors by the multiple receive antennas and decodes the received signal vectors into the original information. A narrowband flat fading MIMO system is modeled as:

$$y=Hx+n$$

where y and x are the receive and transmit vectors, respectively, and H and n are the channel matrix and the noise vector, respectively, where x is a Mt×1 vector, where Mt is the number of transmit antennas, and where y and n are Mr×1 vectors.

FIG. 2 is a diagram depicting an exemplary MIMO receiver (prior art). Channel estimation is needed in multi-user and single-user MIMO receivers to separate different spatial streams and/or user signals via equalization. Of special interest is OFDMA and SC-FDMA multi-user MIMO channel estimation with a single spatial stream per user (e.g., LTE uplink). After cyclic prefix (CP) removal and a fast Fourier transform (FFT), the input to the channel estimator block is the received frequency domain signal of reference symbols from Mr number of receive antennas. The outputs are channel responses in the frequency domain from user u (1≤u≤U) to antenna m (0≤m≤Mr−1) are demodulated (demod) and decoded.

With respect to MU-MIMO channel estimation for OFDMA/SC-FDMA, user reference signals with different cyclic shifts are orthogonal across a number of tones in ideal scenarios (no timing offset and low delay spread). In this case, channel estimation for each user is decoupled. In practice, orthogonality is destroyed because of different user timing offsets and/or medium to high delay spreads. As noted in the patent application entitled, MULTIUSER MULTIPLE INPUT MULTIPLE-OUTPUT (MU-MIMO) CHANNEL ESTIMATION FOR MULTICARRIER COMMUNICATIONS, invented by Ravi Narasimhan et al., Ser. No. 12/782,066, the loss of orthogonality between the reference signals caused by propagation medium distortion errors may be compensated for by finding a channel estimate across the plurality of adjacent subcarrier frequencies for each multicarrier signal channel, in response to assuming a linear phase rotation for each channel across the plurality of adjacent reference signal subcarriers, and a constant amplitude for each channel across the plurality of adjacent reference signal subcarriers. More explicitly, the assumption of linear phase rotation and constant amplitude permits the use of one of the following DoA algorithms: classic beamforming, Capon beamforming, MUSIC, ESPRIT, alternating projection, or simplified projection.

In order to detect and decode all the multiplexed spatial streams, either from a single user or multiple users, the number of the receive antennas at the eNodeB has to be at least the total number of the spatial streams. A typical receiver uses a MMSE equalizer, which applies a feed-forward weight to the received signal vectors to minimize the post-equalized symbol-wise mean square error (MSE).

However, it has been shown that for linear receivers there is a performance loss of SC-FDMA uplink in frequency selective fading channel against OFDMA uplink. This is due to the "noise enhancement" from the DFT kernel of SC-FDMA spreading out the noise on deep faded tones. Further, conventional models limited to MU-MIMO, SU-MIMO, or SU-SIMO do not use the feedback of either the desired user/stream or interfering user/stream to improve performance.

It would be advantageous if a SIC equalizer could use the soft symbol outputs from both the desired and interfering user/stream's decoders to improve the performance by not only canceling the interference, but also by providing better equalization for SC-FDMA uplink in frequency selective channel. Therefore, even when there is only a single user single stream uplink, the SIC equalizer degrades to a turbo equalizer, and still provides performance gain.

SUMMARY OF THE INVENTION

Disclosed herein are parallel soft interference cancellation (P-SIC) and serial SIC (S-SIC) processes. The SIC equalizer subtracts feedback in the user plane, in contrast to the antenna plane, which means a reduction in complexity since each soft symbol feedback doesn't have to be scaled according to the channel response of different antennas. The equalizer uses the feedback to improve the quality of the output symbols as well. This type of receiver can be used in LTE uplink MU-MIMO, LTE-Advanced uplink SU, or MU-MIMO, and it improves the throughput performance as compared to a conventional MMSE type of receiver, thus leading to better coverage in cellular networks.

The SIC receiver can cancel not only the interfering streams, but also the inter-symbol interference (ISI) of the desired stream, which comes from the frequency selective fading channel. The SIC equalizer can use the soft symbol outputs from both the desired and interfering user/stream's decoders to improve the performance by not only canceling the interference, but also providing better equalization for the SC-FDMA uplink in the frequency selective channel. Therefore, even when there is only a single user single stream uplink, the SIC equalizer degrades to a turbo equalizer and still provides performance gain.

Accordingly, a method is provided for Soft Interference Cancellation (SIC) in receiving Single Carrier Frequency Division Multiple Access (SC-FDMA) Multiple-Input Multiple Output (MIMO) signals. A receiver with Mr number of antennas accepts a plurality of multicarrier signals transmitted simultaneously, with N overlapping carrier frequencies. The receiver removes a cyclic prefix (CP), and fast Fourier transforms (FFT) the multicarrier signal from each antenna, supplying Mr number of N-tone signals y. Using either P-SIC or S-SIC, interference is canceled in each of the Mr signals, and soft symbols are supplied for each of U layers.

Interference is canceled using the P-SIC process by parallel processing the U layers in an i-th iteration, in response to feedback from an (i−1)th iteration. Alternatively, interference is canceled using the S-SIC process by sequentially processing the U layers in an i-th iteration, in the order of $u_0, u_1, \ldots, u_{U-1}$, using feedback generated from previously processed layers.

More explicitly, parallel processing the U layers includes the following substeps:

1) in the (i−1)th iteration, re-encoding and remodulating soft symbols, creating soft symbol feedback for each layer;

2) performing a discrete Fourier transform (DFT) on the soft symbol feedback for each layer;

3) for each layer being decoded, weighting the DFT precoded soft symbol feedback from U layers, creating a unique weighted feedback sum;

4) in the i-th iteration, feed-forward weighting the Mr number of N-tone signals y, creating a feed-forward weighted signal for each layer;

5) subtracting a weighted feedback sum from the feed-forward weighted signal, creating feedback compensated signal;

6) performing an inverse discrete Fourier transform (IDFT), transferring the feedback compensated signal into the time domain, creating a time domain signal; and, 7) compensating for bias in the time domain signal.

Alternatively, sequentially processing (S-SIC) includes the following substeps:

1) for all the U layers, re-encoding and remodulating soft symbols, creating soft symbol feedback from the i-th iteration for layers already processed in the i-th iteration, and from the (i−1)th iteration for layers not yet processed in the i-th iteration, including the $u_m$-th layer;

2) performing a DFT on the soft symbol feedback from U layers;

3) weighting DFT precoded soft symbol feedback from U layers, creating a weighted feedback sum;

4) feed-forward weighting the Mr number of N-tone signals y, creating a feed-forward weighted signal;

5) subtracting the weighted feedback sum from the feed-forward weighted signal, creating feedback compensated signal;

6) performing an IDFT, transferring the feedback compensated signal into the time domain, creating a time domain signal; and, 7) compensating for bias in the time domain signal.

Additional details of the above-described method, and a Soft Interference Cancellation (SIC) system in a Single Carrier Frequency Division Multiple Access (SC-FDMA) Multiple-Input Multiple Output (MIMO) receiver, are provided below.

BRIEF DESCRIPTION OF THE DRAWINGS

FIG. 3 is a schematic block diagram of a Soft Interference Cancellation (SIC) system in a Single Carrier Frequency Division Multiple Access (SC-FDMA) Multiple-Input Multiple Output (MIMO) receiver.

DETAILED DESCRIPTION

Figure 1:
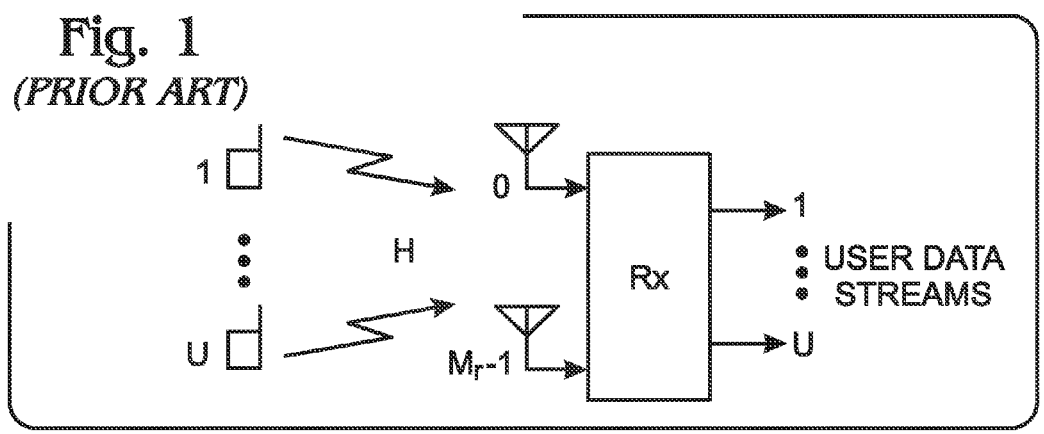
FIG. 1 is a diagram depicting a Multiuser MIMO (MU-MIMO) wireless communication system (prior art).
Figure 2:
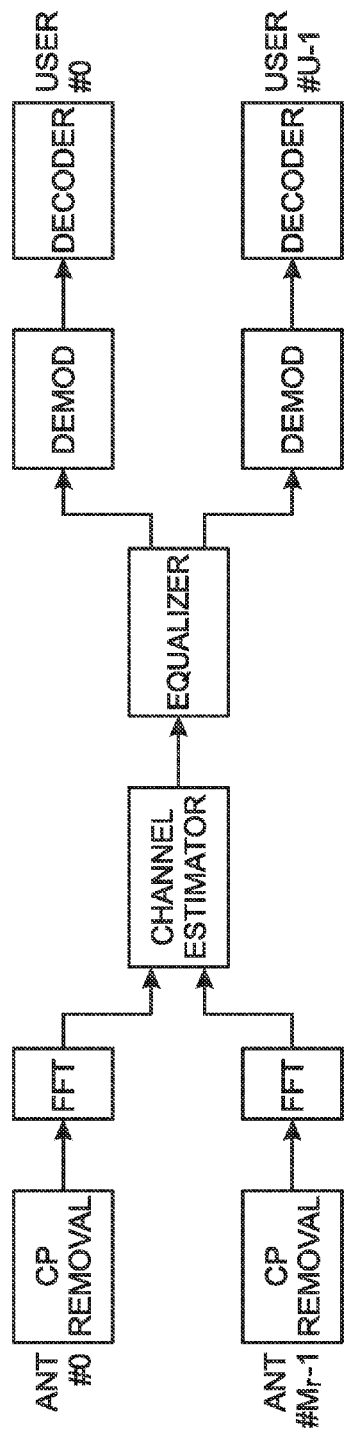
FIG. 2 is a diagram depicting an exemplary MIMO receiver (prior art).

FIG. 3 is a schematic block diagram of a Soft Interference Cancellation (SIC) system in a Single Carrier Frequency Division Multiple Access (SC-FDMA) Multiple-Input Multiple Output (MIMO) receiver 300. The SIC system 302 comprises a plurality of Mr antennas 304 accepting a plurality of multicarrier signals transmitted simultaneously, with N overlapping carrier frequencies. Shown are antennas 304-0 through 304-(Mr−1), where Mr is an integer variable not limited to any particular value. A plurality of Mr pre-processing modules 306, each connected to a corresponding antennas 304, perform cyclic prefix (CP) removal and a fast Fourier transform (FFT) for each multicarrier signal, and supply Mr number of N-tone signals y. A plurality of Mr channel estimation modules 308, each connected to a corresponding pre-processing module 306, provide computed weights that are applied to feed-forward and feedback weighting.

An equalizer 310 has an input connected to the plurality of pre-processing modules 306, an input to accept feed-forward and feedback weighting instructions from the channel estimators 308, an input to accept feedback of previously demodulated soft symbols, and an output to supply a bias compensated signal in the time domain on line 311. A demodulator/decoder module 312 has an input connected to the equalizer 310 and an output on line 314 to supply soft symbols.

A feedback module 316 has an input on line 316 to accept soft symbols from the demodulator/decoder module 312 and an output on line 318 to supply the feedback to the equalizer 310. In response to control unit 320, the equalizer 310 uses either a parallel SIC (P-SIC) or successive SIC (S-SIC) to cancel interference in each of the Mr signals and supply soft symbols for each of U layers.

P-SIC

When the equalizer 310 uses the P-SIC process, it parallel processes a corresponding one of the U layers in an i-th iteration, in response to feedback from an (i−1)th iteration. More explicitly, the feedback module 316 re-encodes and remodulates soft symbols in the (i−1)th iteration, creating soft symbol feedback for each layer. The equalizer 310 further includes a discrete Fourier transform (DFT) module 322 connected to the feedback module on line 318, which performs a DFT on soft symbol feedback. A feedback weighting module 324 connected to the DFT module 322 weights DFT precoded soft symbol feedback and supplies a weighted feedback signal. A feed-forward weighting module 326 is connected to the plurality of pre-processing modules 306 for weighting N-tone signals y and supplying weighted feed-forward signals. A summing module 328 subtracts weighted feedback signals from feed-forward weighted signals, creating feedback compensated signals. An inverse discrete Fourier transform (IDFT) module 330 transfers the feedback compensated signal into the time domain, creating a time domain signal. A compensation module 332 compensates for bias in the time domain signal. The demodulator/decoder 312 demodulates and decodes the bias compensated signal.

In one example, the demodulator/decoder 312 includes a demodulator 334, descrambler 336, deinterleaver 338, rate dematcher 340, and a decoder 342. The feedback module 316 includes a soft symbol rate matcher 344, soft symbol interleaver 346, soft symbol scrambler 348, and soft symbol modulator 350. These modules, or modules providing equivalent results, are well known in the art.

Each pre-processing module 306 supplies an N tone signal y as follows:

$$y = H^* r^* s + w,$$

where $$H = \begin{bmatrix} H_{0,0} & \cdots & \cdots & H_{0,U-1} \\ \vdots & \ddots & & \vdots \\ \vdots & & \ddots & \vdots \\ H_{M_r,0} & \cdots & \cdots & h_{M_r,U-1} \end{bmatrix}$$

$$H_{m,u} = blockdiag[h_{u,k}(m), (k = 0, 1, \ldots, N-1)]$$

-continued $$\Gamma = I_U \otimes F$$

$$s_u = [s_{0,u}, \ldots, s_{N-1,u}]^T$$

$$s = [s_0^T, \ldots, s_u^T, \ldots, s_{U-1}^T]^T$$

$$w = [w_0^T, \ldots, w_{M,-1}^T]^T$$

F is the N point DFT kernel;
w is the noise vector of length $M_r N$;
$\otimes$ is Kronecker product, The equalizer 310 feed-forward weights the Mr number of N-tone signals using a $G_u^{(i)} N \times M_r N$ feed-forward matrix in the i-th iteration, for the u-th layer, and weights soft symbol feedback from U layers using a $B_u^{(i)} N \times UN$ feed-back matrix in the i-th iteration, for the u-th layer. The equalizer 310 compensates for bias in the time domain signal using a $D_u^{(i)}$ N×N diagonal matrix to remove bias in the i-th iteration, for the u-th layer.

In one aspect, the equalizer uses the $G_u^{(i)} N \times M_r N$ feed-forward matrix by minimizing a mean square error (MSE) function per tone, such that $G_u^{(i)}$ has the following format:

$$G_u^{(i)} = [G_{u,0}^{(i)} G_{u,1}^{(i)} \ldots G_{u,M_r-1}^{(i)}]$$

where all submatrices are diagonal;
Further, using the $B_u^{(i)} N \times UN$ feed-back matrix in the i-th iteration, for the u-th layer, includes minimizing a MSE function per tone, such that $B_u^{(i)}$ has the following format:

$$B_u^{(i)} = [B_{u,0}^{(i)} B_{u,1}^{(i)} \ldots B_{u,U-1}^{(i)}]$$

where all submatrices are diagonal.
The equalizer 310 minimizes the MSE function as follows:

$$J_{u,k}^{(i)} = E\left[\left\|g_{u,k}^{(i)H} \tilde{y}_k - \sum_{v=0}^{U-1} b_{u,v,k}^{(i)} \hat{x}_{k,v}^{(i-1)} - x_{k,u}\right\|^2\right]$$

$$= E_{xs}\left|g_{u,k}^{(i)H} h_{u,k} - 1\right|^2 + \sum_{v \neq u} E_{xs}\left|g_{u,k}^{(i)H} h_{v,k}\right|^2 +$$

$$g_{u,k}^{(i)H} R_k g_{u,k}^{(i)} + \sum_{v=0}^{U-1} E_{\tilde{s}\tilde{s},v}^{(i)} |b_{u,v,k}^{(i)}|^2 -$$

$$2\operatorname{Re}\left[E_{\tilde{s}\tilde{s},u}^{(i)}\left(g_{u,k}^{(i)H} h_{u,k} - 1\right) b_{u,u,k}^{(i)*}\right] - \sum_{v \neq u} 2\operatorname{Re}\left[E_{\tilde{s}\tilde{s},v}^{(i)} g_{u,k}^{(i)H} h_{v,k} b_{u,v,k}^{(i)*}\right]$$

with constraint $\sum_{k=0}^{N-1} b_{u,u,k}^{(i)} = 0$ where $$\tilde{y}_k = [y_{k,0}, \ldots, y_{k,M_r-1}]^T,$$

and $$x_v = F s_v, \hat{x}_v = F \hat{s}_v$$

where $$g_{u,k}^{(i)} = [G_{u,0}^{(i)}(k,k), \ldots, G_{u,M_r-1}^{(i)}(k,k)]^H$$

$$b_{u,v,k}^{(i)} = B_{u,v}^{(i)}(k,k)$$

and where the noise and interference covariance matrix $R_k$ is assumed to be known by the receiver, and
where $$R_k(m,n) = E[w_m;(k) w_n(k)^*]$$

wherein $B_u^{(i)}$ and $G_u^{(i)}$ are computed based upon $R_k$; and, where Re is a real part.

Then, weighting soft symbol feedback from U layers includes making the following assumptions:
the soft symbols being independent across users and DFT-spreading inputs; and,
a cross-correlation of transmitted and soft symbols is equal to variance of soft symbols, such that $E[s_v s_v^*] = E_{ss}I$, $E[s_v \hat{s}_v^{(i-1)*}] = E_{s\hat{s},v}^{(i-1)}I$, $E[\hat{s}_v^{(i-1)} s_v^*] = E_{\hat{s}s,v}^{(i-1)}I$, $E[\hat{s}_v^{(i-1)} \hat{s}_v^{(i-1)*}] = E_{\hat{s}\hat{s},v}^{(i-1)}I$ where Ess is an averaged constellation signal power.

In another aspect, the equalizer 310 optimizes feed-forward weighting as follows:

$$g_{u,k}^{(i)H} = \rho_u^{(i)} \tilde{g}_{u,k}^{(i)H}$$

$$\tilde{g}_{u,k}^{(i)H} = h_{u,k}^H C_k^{(i)-1}$$

$$\rho_u^{(i)} = \frac{E_{ss}}{1 + \beta_u^{(i-1)} E_{ss} T_u^{(i)}}$$

$$T_u^{(i)} = \frac{1}{N} \sum_{k=0}^{N-1} \tilde{g}_{u,k}^{(i)H} h_{u,k}$$

$$C_k^{(i)} = \sum_{v=0}^{U-1} E_{ss}(1 - \beta_v^{(i-1)}) h_{v,k} h_{v,k}^H + R_k$$

$$\beta_u^{(i-1)} = \frac{|E_{s\hat{s},u}^{(i-1)}|^2}{E_{\hat{s}\hat{s},u}^{(i-1)} E_{ss}}$$

and weighting soft symbol feedback from U layers is optimized as follows:

$$b_{u,u,k}^{(i)} = \alpha_u^{(i)} \rho_u^{(i)} (\tilde{g}_{u,k}^{(i)H} h_{u,k} - T_u^{(i)})$$

$$b_{u,v,k}^{(i)} = \alpha_v^{(i)} g_{u,k}^{(i)H} h_{v,k}, \quad \text{for } u \neq v$$

$$\alpha_u^{(i)} = \frac{E_{s\hat{s},u}^{(i)}}{E_{\hat{s}\hat{s},u}^{(i)}}$$

where $T_u^{(i)}$, $\alpha$, and $C_k^{(i)}$ are intermediate terms.

The compensation module 332 compensates for bias in the time domain signals by calculating $BIAS = \rho_u^{(i)} T_u^{(i)}$ $MSE = E_{ss}(\rho_u^{(i)} T_u^{(i)} - 1)^2 - E_{ss}(1-\beta_u^{(i-1)})(\rho_u^{(i)} T_u^{(i)})^2 + \rho_u^{(i)} T_u^{(i)}$ calculating a bias correction matrix $$D_u^{(i)} = \frac{1}{BIAS} I$$

and calculating a symbol-wise signal-to-noise ratio (SNR)

$$SNR = \frac{BIAS^2 E_{ss}}{MSE - (BIAS-1)^2 E_{ss}} = \frac{T_u^{(i)} E_{ss}}{1 - E_{ss}(1-\beta_u^{(i-1)}) T_u^{(i)}}$$

where I is the identity matrix.

S-SIC

If the equalizer 310 uses a S-SIC process, it sequentially processes the U layers in an i-th iteration, in the order of $u_0, u_1, \ldots, u_{U-1}$, using feedback generated from previously processed layers. More explicitly, the feedback module 316, for all the U layers, re-encodes and remodulates soft symbols, creating soft symbol feedback from the i-th iteration for layers already processed in the i-th iteration, and from the (i−1)th iteration for layers not yet processed in the i-th iteration, including the $u_m$-th layer.

The order of spatial streams being processed may be based on a number of methods, such as the well-known MMSE sorted QR decomposition process. Alternatively, the post MMSE equalized SNR based estimated channel H may be computed and the streams detected based on the decreasing order of post equalized SNR. Otherwise, the post MMSE equalized SNR and the difference from the required SNR for a certain block error rate, e.g., 10%, may be computed given the modulation and coding rate of the stream. Detecting the streams is then based on the decreasing order of the SNR margin.

In one aspect, each pre-processing module 306 supplies an N-tone signal y as follows:

$y = H * \Gamma * s + w$, where $$H = \begin{bmatrix} H_{0,0} & \cdots & \cdots & H_{0,U-1} \\ \vdots & \ddots & & \vdots \\ \vdots & & \ddots & \vdots \\ H_{M_r,0} & \cdots & \cdots & h_{M_r,U-1} \end{bmatrix}$$

$H_{m,u} = \text{Diag}[h_{u,k}(m), (k = 0, 1, \ldots, N-1)]$ $\Gamma = I_U \otimes F$ $s_u = [s_{0,u}, \ldots, s_{N-1,u}]^T$ $s = [s_0^T, \ldots, s_u^T, \ldots, s_{U-1}^T]^T$ $w = [w_0^T, \ldots, w_{M_r-1}^T]^T$ F is the N point DFT kernel,
w is the noise vector of length $M_r N$
$\otimes$ is Kronecker product.

The equalizer 310 feed-forward weights the Mr number of N-tone signals using a $G_{u_m}^{(i)} N \times M_r N$ feed-forward matrix in the i-th iteration, for the $u_m$-th layer, and weights soft symbol feedback from U layers using a $B_{u_m}^{(i)} N \times UN$ feed-back matrix in the i-th iteration, for the $u_m$-th layer. The equalizer 310 compensates for bias in the time domain signal using a $D_{u_m}^{(i)}$ is N×N diagonal matrix to remove bias in the i-th iteration, for the $u_m$-th layer.

In one aspect, the equalizer 310 uses the $G_{u_m}^{(i)} N \times M_r N$ feed-forward matrix by minimizing a MSE function per tone, such that $G_{u_m}^{(i)}$ has the following format:

$G_{u_m}^{(i)} = [G_{u_m,0}^{(i)} G_{u_m,1}^{(i)} \ldots G_{u_m,M_r-1}^{(i)}]$ where all submatrices are diagonal.

The equalizer 310 uses the $B_{u_m}^{(i)} N \times UN$ feed-back matrix by minimizing a MSE function per tone, such that $B_{u_m}^{(i)}$ has the following format:

$B_{u_m}^{(i)} = [B_{u_m,0}^{(i)} B_{u_m,1}^{(i)} \ldots B_{u_m,U-1}^{(i)}]$ where all submatrices are diagonal.

The equalizer 310 minimizes the MSE function as follows:

$$J_{u,k}^{(i)} = E\left[\left\|g_{u_m,k}^{(i)H}\tilde{y}_k - \sum_{l=0}^{m-1} b_{u_m,u_l,k}^{(i)} \hat{x}_{k,u_l}^{(i)} - \sum_{l=m}^{U-1} b_{u_m,u_l,k}^{(i)} \hat{x}_{k,u_l}^{(i-1)} - x_{k,u_m}\right\|^2\right]$$

with constraint $\sum_{k=0}^{N-1} b_{u_m,u_m,k}^{(i)} = 0$ where $$\tilde{y}_k = [y_{k,0}, \ldots, y_{k,M_r-1}]^T$$

and $$x_v = Fs_v, \hat{x}_v = F\hat{s}_v$$

where $$g_{u_m,k}^{(i)} = [G_{u_m,0}^{(i)}(k,k), \ldots, G_{u_m,M_r-1}^{(i)}(k,k)]^H$$

$$b_{u_m,u_l,k}^{(i)} = B_{u_m,u_l}^{(i)}(k,k)$$

where the noise and interference covariance matrix $R_k$ is assumed to be known by the receiver and where $$R_k(m,n) = E[w_m;(k)w_n(k)^*]$$

wherein $B_u^{(i)}$ and $G_u^{(i)}$ are computed based upon $R_k$.

In another aspect, the equalizer 310 optimizes the feed-forward weighting as follows:

$$g_{u_m,k}^{(i)H} = \rho_{u_m}^{(i)} \tilde{g}_{u_m,k}^{(i)H}$$

$$\tilde{g}_{u_m,k}^{(i)H} = h_{u_m,k}^H C_{u_m,k}^{(i)-1}$$

$$\rho_{u_m}^{(i)} = \frac{E_{ss}}{1 + \beta_{u_m}^{(i-1)} E_{ss} T_{u_m}^{(i)}}$$

$$T_{u_m}^{(i)} = \frac{1}{N} \sum_{k=0}^{N-1} \tilde{g}_{u_m,k}^{(i)H} h_{u_m,k}$$

$$C_{u_m,k}^{(i)} = \sum_{l=0}^{m-1} E_{ss}(1 - \beta_{u_l}^{(i)}) h_{u_l,k} h_{u_l,k}^H + \sum_{l=m}^{U-1} E_{ss}(1 - \beta_{u_l}^{(i-1)}) h_{u_l,k} h_{u_l,k}^H + R_k$$

$$\beta_u^{(i)} = \frac{E_{\hat{s}\hat{s},u}^{(i)2}}{E_{\hat{s}\hat{s},u}^{(i)} E_{ss}}$$

wherein weighting soft symbol feedback from U layers is optimized as follows:

$$b_{u_m,u_m,k}^{(i)} = \alpha_{u_m}^{(i-1)} \rho_{u_m}^{(i)} (\tilde{g}_{u_m,k}^{(i)H} h_{u_m,k} - T_{u_m}^{(i)})$$

$$b_{u_m,u_l,k}^{(i)} = \alpha_{u_l}^{(i)} g_{u_m,k}^{(i)H} h_{u_l,k}, \text{ for } l < m$$

$$b_{u_m,u_l,k}^{(i)} = \alpha_{u_l}^{(i-1)} g_{u_m,k}^{(i)H} h_{u_l,k}, \text{ for } l > m$$

$$\alpha_u^{(i)} = \frac{E_{\hat{s}\hat{s},u}^{(i)}}{E_{\hat{s}\hat{s},u}^{(i)}}$$

where $T_{u_m}^{(i)}$, $\alpha$, and $C_{u_m,k}^{(i)}$ are intermediate terms.

The compensation module 332 compensates for bias in the time domain signal by calculating $$\text{BIAS} = \rho_{u_m}^{(i)} T_{u_m}^{(i)}$$

$$\text{MSE} = E_{ss}(\rho_{u_m}^{(i)} T_{u_m}^{(i)} - 1)^2 - E_{ss}(1 - \beta_{u_m}^{(i-1)})(\rho_{u_m}^{(i)} T_{u_m}^{(i)})^2 + \rho_{u_m}^{(i)} T_{u_m}^{(i)}$$

calculating a bias correction matrix $$D_{u_m}^{(i)} = \frac{1}{\text{BIAS}} I$$

and calculating a symbol-wise SNR $$SNR = \frac{\text{BIAS}^2 E_{ss}}{MSE - (\text{BIAS}-1)^2 E_{ss}} = \frac{T_u^{(i)} E_{ss}}{1 - E_{ss}(1 - \beta_u^{(i-1)}) T_u^{(i)}}$$

where I is the identity matrix.

Using either the S-SIC or P-SIC process, the demodulator/decoder 312 may supply soft symbols for each of U layers by converting from bit-wise likelihood to symbol-wise likelihood as follows:

$$\hat{s}_k = \sum_{k=0}^{M-1} Pr(s_k) s_k$$

$$Pr(s_k) = \prod_{j=0}^{log_2(M)-1} Pr(b_j(s_k)),$$

where M is the constellation size; and,
where $Pr(b_j(S_k))$ is the probability of the jth bit being fed back from a soft symbol.

Functional Description

A soft interference cancellation receiver has been presented in FIG. 3 for SC-FDMA uplink in LTE and LTE-A. This receiver works in an iterative way between the equalizer and decoder. The equalizer uses the soft feedback from the decoder to cancel the interfering streams. The post-equalized symbol-wise MSE can be reduced by canceling out the interferences. As a result, the error rate performance of MU-MIMO or SU-MIMO uplink in LTE or LTE-A can be greatly improved.

The SIC receiver can cancel not only the interfering streams, but also the inter-symbol interference (ISI) of the desired stream, which comes from the frequency selective fading channel. This processing further reduces the post-equalized symbol-wise MSE, and then improves the overall performance, even when there is only a single stream uplink, i.e. SISO or SIMO. Two architectures have been presented for the receiver: P-SIC and S-SIC. In P-SIC, the equalizer waits until all the feedback from previous iterations is completed, and then works on all the streams in parallel. In S-SIC, each spatial stream is equalized sequentially and decoded as soon as possible, and the intermediate feedback is generated to help the next spatial stream. A similar model applies to the equalizers of P-SIC and S-SIC. The unified signal processing allows cancelling interference from both the interfering spatial streams and interfering multipath taps. It also works for both P-SIC and S-SIC architectures, as well as for any transmitter/receiver (Tx-Rx) setup, i.e. MU-MIMO, SU-MIMO, SIMO, and SISO. As can be seen in FIG. 3, the same device structure can be used for both the P-SIC and S-SIC processes.

It is assumed that there are U spatial streams being sent on N contiguous subcarriers over a time slot in LTE or LTE-A. Here, part or all of the spatial streams may come from different or the same user(s). A single time slot in LTE or LTE-A uplink has 1 pilot symbol and 5 or 6 data symbols depending on the cyclic prefix (CP) type. At the transmitter side, for the uth spatial stream, a vector of $s_u = [s_{0,u}, \ldots, s_{N-1,u}]^T$ is first precoded by N-point DFT kernel F, and then mapped onto N contiguous frequency subcarriers. The vector is then zero padded and passed through the transmitter front end, including a $N_F$-point IFFT, CP insertion, and half subcarrier rotation. All the spatial streams are mapped onto the same N frequency subcarriers.

In order to detect and decode all the U spatial streams, the eNodeB is equipped with Mr (Mr≥U) receive antennas. Therefore, there are (U×Mr) MIMO channels from the transmitters to the receiver antennas, and each channel may be subject to frequency selective fading. $h_{u,k(m)}$ is defined as the channel response from the transmitter sending the uth spatial stream to the mth receive antenna on the kth subcarrier. After the signal is received on each antenna, the front end processing is done first, including a $N_F$ point FFT, CP removal, and half subcarrier rotation. Then, the allocated N-tone signal is extracted out, as described in detail above.

In P-SIC, the equalizer works on all the spatial streams once, getting the equalized symbol output for all spatial streams. Then, each individual stream goes through a demodulator, deinterleaver, rate dematcher, and turbo decoder. The soft output of the turbo decoder, of all the streams, is fed back through a rate matcher, interleaver, and soft symbol generator, and used by the P-SIC equalizer for the round.

In S-SIC, the U spatial streams are processed by the equalizer sequentially. After one spatial stream is equalized, the output is demodulated, deinterleaved, rate dematched and decoded. The soft feedback is generated and fed back to the S-SIC equalizer, to be used when the equalizer works on the next spatial stream. Note that in LTE-A SU-MIMO case, a single transport block can be divided into multiple spatial streams, and the decoder needs to wait until all the streams are ready to start decoding. If this happens, S-SIC starts equalizing the next spatial stream without getting the preceding feedback. A global iteration in P-SIC or S-SIC is defined as the process of all the streams being equalized, decoded, and remodulated once. Different from P-SIC, the ordering of the streams being processed does affect the performance of S-SIC. The benefit of S-SIC receiver is that the instant feedback generated in the same global iteration cycle can be used to help in equalizing the next spatial stream. However, clearly, the drawback of doing so is longer latency requirement.

In summary, with P-SIC, all spatial streams (users) are decoded in parallel, and interference from all streams is cancelled in parallel. With S-SIC, spatial streams (users) are detected one at a time according to a detection order. After a stream is detected, soft interference from the stream is cancelled before detecting the subsequent streams. Multiple iterations of P-SIC or S-SIC can be used depending on performance vs. latency/complexity tradeoff.

Figure 4:
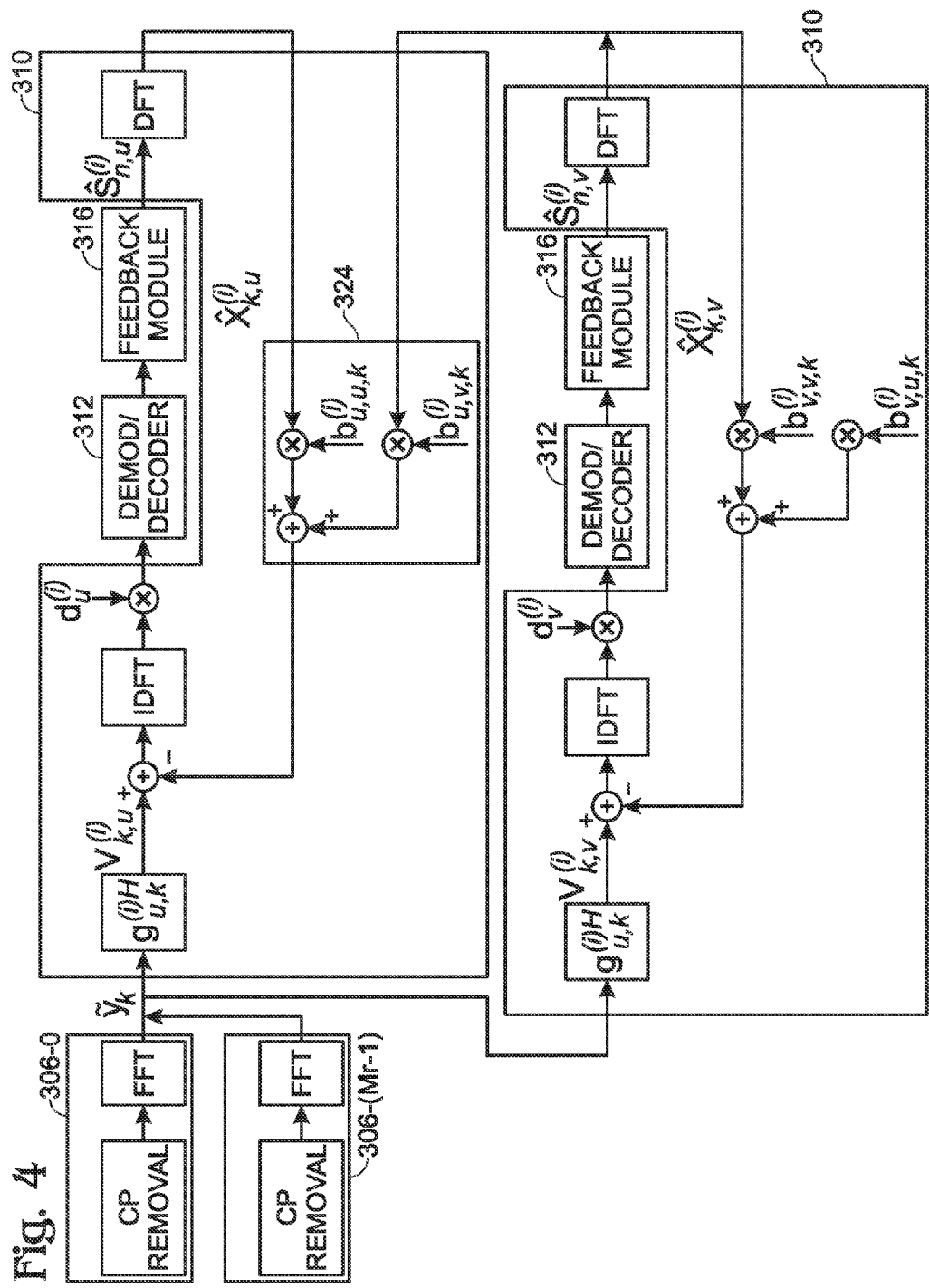
FIG. 4 is a schematic block diagram depicting FIG. 3 as a P-SIC system with two users (U=2).

FIG. 4 is a schematic block diagram depicting FIG. 3 as a P-SIC system with two users (U=2). A separate equalizer 310, demodulator/decoder 312, and feedback module 316 are associated with each layer. Alternatively, as explained above, a single equalizer 310, demodulator/decoder 312, and feedback module 316 are shared between the two (U) layers.

Figure 5:
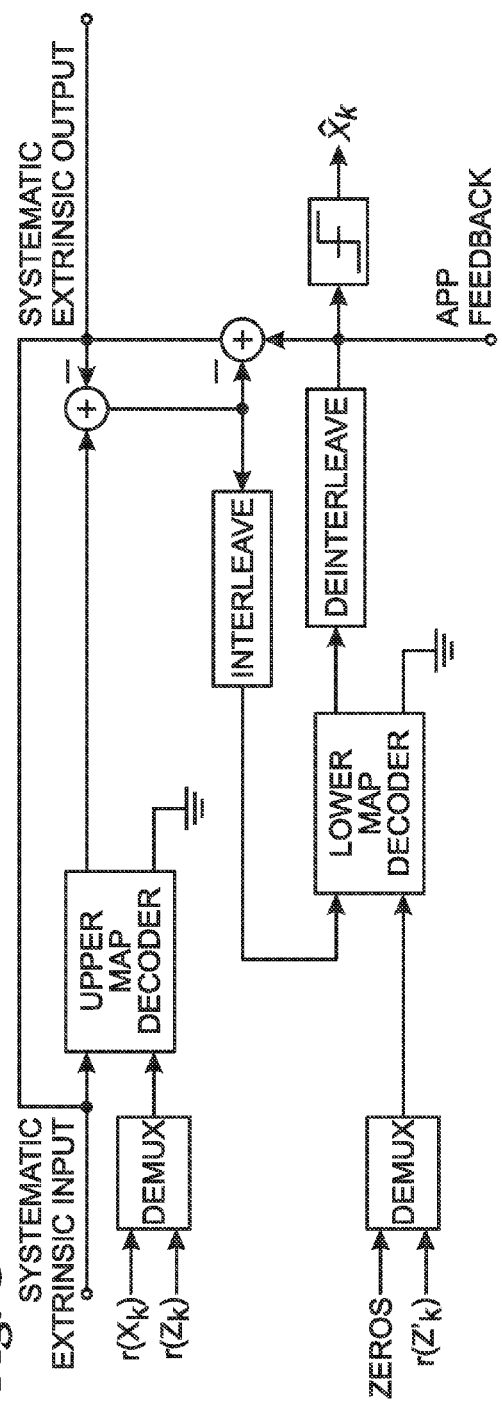
FIG. 5 is a schematic block diagram of a turbo decoder suitable for use with either a P-SIC or S-SIC system.

FIG. 5 is a schematic block diagram of a turbo decoder suitable for use with either a P-SIC or S-SIC system. The decoder provides a posteriori probability (APP) soft feedback. Per SIC iteration, systematic extrinsic information can be saved, which is loaded by the turbo decoder in the next round SIC iteration. The benefit is that the turbo decoder may converge faster. Systematic extrinsic information can be derived from APP feedback of the whole codeword.

Figure 6:
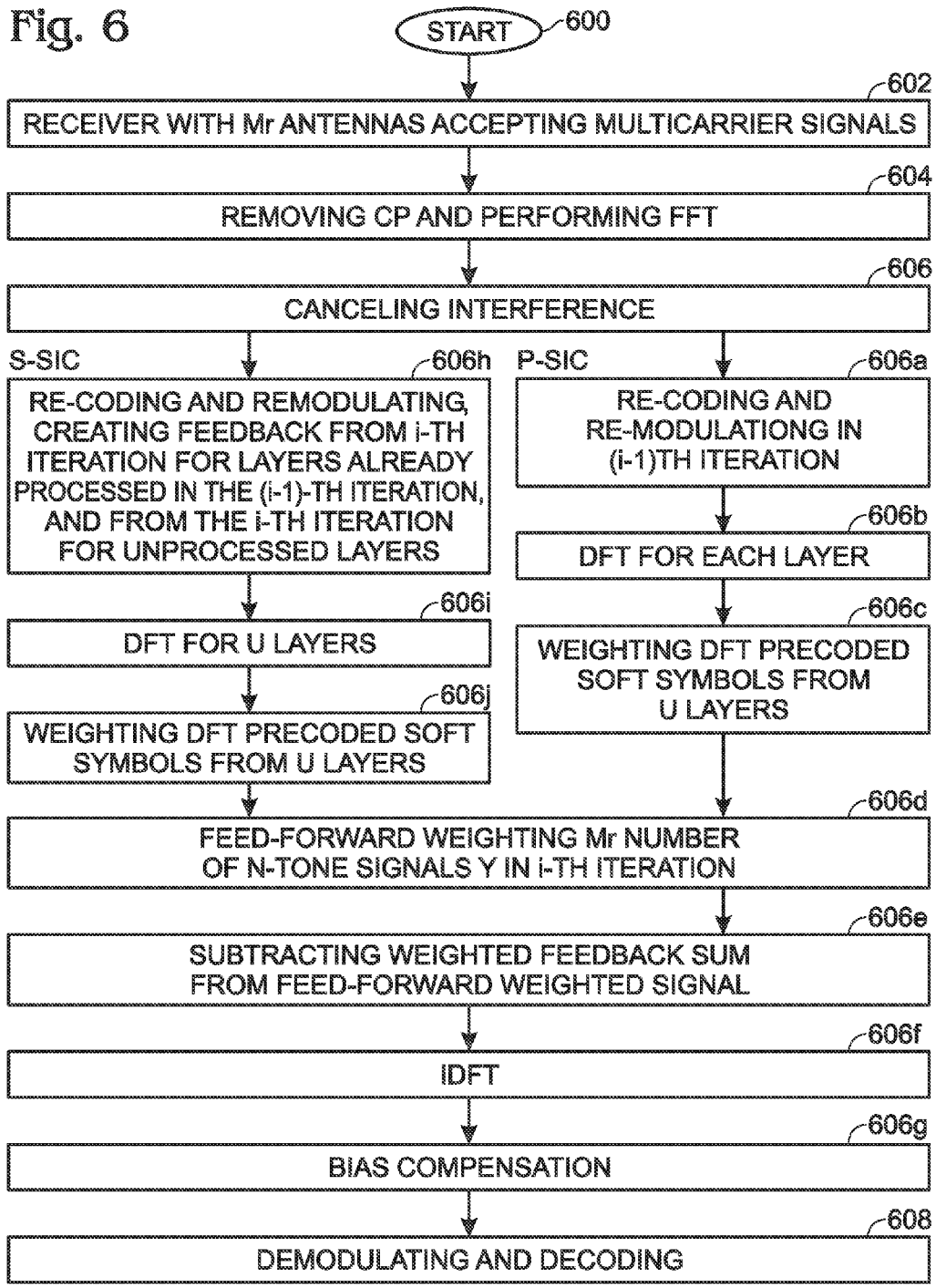
FIG. 6 is a flowchart illustrating a method for SIC in receiving SC-FDMA MIMO signals.

FIG. 6 is a flowchart illustrating a method for SIC in receiving SC-FDMA MIMO signals. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 600.

In Step 602 a receiver with Mr antennas accepts a plurality of multicarrier signals transmitted simultaneously, with N overlapping carrier frequencies. Step 604 removes CP, and FFTs the multicarrier signal from each antenna, supplying Mr number of N-tone signals y. Step 606 uses either a P-SIC or S-SIC to cancel interference in each of the Mr signals. Step 608 performs demodulation and decoding, and supplies soft symbols for each of U layers.

In one aspect, canceling interference in Step 606 includes using a P-SIC process, and in an i-th iteration, parallel processing the U layers in response to feedback from an (i−1)th iteration. More explicitly, Step 606 includes the following substeps. Step 606a re-encodes and remodulates soft symbols in the (i−1)th iteration, creating soft symbol feedback for each layer. Step 606b performs a discrete Fourier transform (DFT) on the soft symbol feedback for each layer. For each layer being decoded, Step 606c weights the DFT precoded soft symbol feedback from U layers, creating a unique weighted feedback sum. In the i-th iteration, Step 606d feed-forward weights the Mr number of N-tone signals y, creating a feed-forward weighted signal for each layer. Step 606e subtracts a weighted feedback sum from the feed-forward weighted signal, creating feedback compensated signal. Step 606f performs an IDFT, transferring the feedback compensated signal into the time domain, creating a time domain signal. Step 606g compensates for bias in the time domain signal. Then, supplying soft symbols for each of the U layers in Step 608 includes demodulating and decoding the bias compensated signal.

Additional details of the P-SIC process are provided above in the explanation of FIG. 3, and are not repeated here in the interest of brevity.

In an alternative aspect, canceling interference in Step 606 includes using a S-SIC process, and in an i-th iteration, sequentially processing the U layers in the order of $u_0, u_1, \ldots, u_{U-1}$ using feedback generated from previously processed layers. More explicitly, sequentially processing in Step 606 includes the following substeps. For all the U layers, Step 606h re-encodes and remodulates soft symbols, creating soft symbol feedback from the i-th iteration for layers already processed in the i-th iteration, and from the (i−1)th iteration for layers not yet processed in the i-th iteration, including the $u_m$-th layer. Step 606i performs a DFT on the soft symbol feedback from U layers. Step 606j weights DFT precoded soft symbol feedback from U layers, creating a weighted feedback sum. Step 606d feed-forward weights the Mr number of N-tone signals y, creating a feed-forward weighted signal. Step 606e subtracts the weighted feedback sum from the feed-forward weighted signal, creating feedback compensated signal. Step 606f performs an IDFT, transferring the feedback compensated signal into the time domain, creating a time domain signal. Step 606g compensates for bias in the time domain signal. Then, supplying soft symbols for each of the U layers in Step 608 includes demodulating and decoding the bias compensated signal for the U layers.

Additional details of the S-SIC process are provided above in the explanation of FIG. 3, and are not repeated here in the interest of brevity.

Using either the P-SIC or S-SIC approach, in one aspect supplying soft symbols for each of U layers includes converting from bit-wise likelihood to symbol-wise likelihood as follows:

$$\hat{s}_k = \sum_{k=0}^{M-1} Pr(s_k) s_k$$

$$Pr(s_k) = \prod_{j=0}^{\log_2(M)-1} Pr(b_j(s_k)),$$

where M is the constellation size; and, where $Pr(b_j(S_k))$ is the probability of the jth bit being fed back from a soft symbol.

A system and method have been provided for SIC in a SC-FDMA MIMO receiver. Examples of particular hardware units and signal notation have been presented to illustrate the invention. However, the invention is not limited to merely these examples. Other variations and embodiments of the invention will occur to those skilled in the art.

We claim:

1. A method for soft interference cancellation, comprising:
accepting, by a receiver comprising Mr antennas, a plurality of multicarrier signals substantially simultaneously, wherein the plurality of multicarrier signals comprise N overlapping carrier frequencies, and where Mr and N are integers;
removing a cyclic prefix and fast Fourier transforming the plurality of multicarrier signals to yield Mr N-tone signals y; and
canceling interference of respective signals of the Mr N-tone signals using a successive SIC (S-SIC) process, wherein the successive S-SIC process comprises:
re-encoding and re-modulating soft symbols for respective U layers to yield soft symbol feedback from an i-th iteration for layers, of the U layers, already processed in the i-th iteration, and
encoding and re-modulating soft symbols from a (i−1)th iteration for layers, of the U layers, not yet processed in the i-th iteration, where U and i are integers.

2. The method of claim 1, wherein the S-SIC process further comprises, in an i-th iteration, sequentially processing the U layers in an order of $u_0, u_1, \ldots, u_{U-1}$ using feedback generated from previously processed layers.

3. The method of claim 2, wherein the S-SIC process further comprises:
performing a discrete Fourier transform (DFT) on the soft symbol feedback from the U layers to yield precoded soft symbol feedback;
weighting the precoded soft symbol feedback from the U layers to yield a weighted feedback sum;
feed-forward weighting the Mr N-tone signals y to yield a feed-forward weighted signal;
subtracting the weighted feedback sum from the feed-forward weighted signal to yield a feedback compensated signal;
performing an inverse discrete Fourier transform and transferring the feedback compensated signal into a time domain to yield a time domain signal;
compensating for bias in the time domain signal; and
demodulating and decoding the bias compensated signal for the U layers to yield soft symbols for the U layers.

4. The method of claim 3, wherein the Mr N-tone signals y are characterized by $$y = H^* \Gamma^* s + w,$$

where $$H = \begin{bmatrix} H_{0,0} & \cdots & \cdots & H_{0,U-1} \\ \vdots & \ddots & & \vdots \\ \vdots & & \ddots & \vdots \\ H_{M_r,0} & \cdots & \cdots & H_{M_r,U-1} \end{bmatrix}$$

$$H_{m,u} = \text{Diag}[h_{u,k}(m), (k = 0, 1, \ldots, N-1)]$$

$$\Gamma = I_U \otimes F$$

$$s_u = [s_{0,u}, \ldots, s_{N-1,u}]^T$$

$$s = [s_0^T, \ldots, s_u^T, \ldots, s_{U-1}^T]^T$$

$$w = [w_0^T, \ldots, w_{M_r-1}^T]^T$$

$h_{uk}(m)$ is a channel response from a transmitter sending a uth spatial stream to an mth receive antenna on a kth subcarrier,
F is an N point DFT kernel,
w is a noise vector of length MrN, and
⊗ is a Kronecker product.

5. The method of claim 4,
wherein the feed-forward weighting of the Mr N-tone signals comprises using a $G_{u_m}^{(i)}$ N×MrN feed-forward matrix in the i-th iteration, for the $u_m$-th layer.

6. The method of claim 5, wherein the weighting of the soft symbol feedback comprises using a $B_{u_m}^{(i)}$ N×UN feed-back matrix in the i-th iteration, for the $u_m$-th layer.

7. The method of claim 6, wherein the compensating for the bias in the time domain signal comprises using a N×N diagonal matrix $D_{u_m}^{(i)}$ to remove the bias in the i-th iteration, for the $u_m$-th layer.

8. The method of claim 7, wherein using the $G_{u_m}^{(i)}$ N×M$_r$N feed-forward matrix in the i-th iteration, for the $u_m$-th layer, comprises minimizing a mean square error (MSE) function per tone, wherein $G_{u_m}^{(i)}$ is characterized by:

$$G_{u_m}^{(i)} = [G_{u_m,0}^{(i)} G_{u_m,1}^{(i)} \ldots G_{u_m,M_r-1}^{(i)}]$$

wherein submatrices of $G_{u_m}^{(i)}$ are diagonal, and
wherein using the $B_{u_m}^{(i)}$ N×UN feed-back matrix in the i-th iteration, for the $u_m$-th layer, comprises minimizing a MSE function per tone, wherein $B_{u_m}^{(i)}$ is characterized by:

$$B_{u_m}^{(i)} = [B_{u_m,0}^{(i)} B_{u_m,1}^{(i)} \ldots B_{u_m,U-1}^{(i)}]$$

wherein submatrices of $B_{u_m}^{(i)}$ are diagonal.

9. The method of claim 8, wherein the MSE function is $$J_{u,k}^{(i)} = E\left[\left\| g_{u_m,k}^{(i)}{}^H \tilde{y}_k - \sum_{l=0}^{m-1} b_{u_m,u_l,k}^{(i)} \hat{x}_{k,u_l}^{(i)} - \sum_{l=m}^{U-1} b_{u_m,u_l,k}^{(i)} \hat{x}_{k,u_l}^{(i-1)} - x_{k,u_m} \right\|^2 \right]$$

with constraint $\sum_{k=0}^{N-1} b_{u_m,u_m,k}^{(i)} = 0$ where $$\tilde{y}_k = [y_{k,0}, \ldots, y_{k,M_r-1}]^T,$$

and $$x_v = Fs_v, \hat{x}_v = F\hat{s}_v$$

where $$g_{u_m,k}^{(i)} = [G_{u_m,0}^{(i)}(k,k), \ldots, G_{u_m,M_r-1}^{(i)}(k,k)]^H$$

$$b_{u_m,u_l,k}^{(i)} = B_{u_m,u_l}^{(i)}(k,k)$$

and wherein a noise and interference covariance matrix $R_k$ is assumed to be known by the receiver, and where $$R_k(m,n) = E[w_m^*(k)w_n(k)^*]$$

wherein $B_u^{(i)}$ and $G_u^{(i)}$ are computed based upon $R_k$.

10. The method of claim 9, further comprising determining the feed-forward weighting based on:

$$g_{u_m,k}^{(i)H} = \rho_{u_m}^{(i)} \tilde{g}_{u_m,k}^{(i)H}$$

$$\tilde{g}_{u_m,k}^{(i)H} = h_{u_m,k}^H C_{u_m,k}^{(i)-1}$$

$$\rho_{u_m}^{(i)} = \frac{E_{ss}}{1 + \beta_{u_m}^{(i-1)} E_{ss} T_{u_m}^{(i)}}$$

$$T_{u_m}^{(i)} = \frac{1}{N} \sum_{k=0}^{N-1} \tilde{g}_{u_m,k}^{(i)H} h_{u_m,k}$$

$$C_{u_m,k}^{(i)} = \sum_{l=0}^{m-1} E_{ss}(1-\beta_{u_l}^{(i)}) h_{u_l,k} h_{u_l,k}^H + \sum_{l=m}^{U-1} E_{ss}(1-\beta_{u_l}^{(i-1)}) h_{u_l,k} h_{u_l,k}^H + R_k$$

$$\beta_u^{(i)} = \frac{E_{s\hat{s},u}^{(i)\,2}}{E_{\hat{s}\hat{s},u}^{(i)} E_{ss}}$$

determining the weighting of the soft symbol feedback based on:

$$b_{u_m,u_m k}^{(i)} = \alpha_{u_m}^{(i-1)} \rho_{u_m}^{(i)} (\tilde{g}_{u_m,k}^{(i)H} h_{u_m,k} - T_{u_m}^{(i)})$$

$$b_{u_m,u_l,k}^{(i)} = \alpha_{u_l}^{(i)} g_{u_m,k}^{(i)H} h_{u_l,k}, \text{ for } l < m$$

$$b_{u_m,u_l,k}^{(i)} = \alpha_{u_l}^{(i-1)} g_{u_m,k}^{(i)H} h_{u_l,k}, \text{ for } l > m$$

$$\alpha_u^{(i)} = \frac{E_{s\hat{s},u}^{(i)}}{E_{\hat{s}\hat{s},u}^{(i)}}$$

where $T_{u_m}^{(i)}$, $\alpha$, and $C_{u_m,k}^{(i)}$ are intermediate terms.

11. The method of claim 10, wherein the compensating for the bias in the time domain signal comprises calculating $$\text{BIAS} = \rho_{u_m}^{(i)} T_{u_m}^{(i)}$$

$$\text{MSE} = E_{ss}(\rho_{u_m}^{(i)} T_{u_m}^{(i)} - 1)^2 - E_{ss}(1-\beta_{u_m}^{(i-1)})(\rho_{u_m}^{(i)} T_{u_m}^{(i)})^2 + \rho_{u_m}^{(i)} T_{u_m}^{(i)}$$

calculating a bias correction matrix $$D_{u_m}^{(i)} = \frac{1}{\text{BIAS}} I$$

and calculating a symbol-wise signal-to-noise ratio (SNR)

$$SNR = \frac{\text{BIAS}^2 E_{ss}}{MSE - (\text{BIAS} - 1)^2 E_{ss}} = \frac{T_{u_m}^{(i)} E_{ss}}{1 - E_{ss}(1-\beta_{u_m}^{(i-1)}) T_{u_m}^{(i)}}$$

where I is an identity matrix.

12. The method of claim 1, further comprising generating soft symbols for the respective U layers, comprising:
converting from bit-wise likelihood to symbol-wise likelihood based on:

$$\hat{s}_k = \sum_{k=0}^{M-1} Pr(s_k) s_k$$

$$Pr(s_k) = \prod_{j=0}^{\log_2(M)-1} Pr(b_j(s_k)),$$

where M is a constellation size; and
where $Pr(b_j(S_k))$ is a probability of a j-th bit being fed back from a soft symbol.

13. A system for soft interference cancellation, comprising:
a plurality of antennas configured to accept a plurality of multicarrier signals substantially simultaneously, wherein the plurality of multicarrier signals comprise N overlapping carrier frequencies, where N is an integer;
a plurality of pre-processing modules connected to corresponding antennas of the plurality of antennas, wherein the plurality of pre-processing modules are configured to perform a cyclic prefix removal and a fast Fourier transform for the plurality of multicarrier signals to yield Mr N-tone signals y, where Mr is an integer corresponding to a number of the plurality of antennas;
a plurality of channel estimation modules connected to corresponding outputs of the plurality of pre-processing modules, wherein the plurality of channel estimation modules are configured to provide feed-forward and feedback weighting;
an equalizer comprising a first input connected to the outputs of the plurality of pre-processing modules, a second input configured to accept feed-forward and feedback weighting instructions, a third input configured to accept feedback of previously demodulated soft symbols, and a first output configured to supply bias compensated signals in a time domain;
a demodulator/decoder module comprising a fourth input connected to the equalizer and a second output configured to supply soft symbols; and
a feedback module comprising a fifth input configured to accept soft symbols from the demodulator/decoder module and a second output configured to supply the feedback to the equalizer,
wherein the equalizer is configured to use a successive SIC (S-SIC) process to cancel interference in the Mr N-tone signals, and
the feedback module is configured to, for respective U layers;
re-encode and re-modulate soft symbols to yield soft symbol feedback from an i-th iteration for layers already processed in the i-th iteration, and
re-encode and re-modulate soft symbols from a (i−1)th iteration for layers not yet processed in the i-th iteration, including a $u_m$-th layer, where U and i are integers.

14. The system of claim 13, wherein the equalizer is further configured to, in the i-th iteration, sequentially process the U layers in an order of $u_0, u_1, \ldots, u_{U-1}$ using feedback generated from previously processed layers of the U layers.

15. The system of claim 14,
wherein the equalizer further comprises:
- a discrete Fourier transform (DFT) module connected to the feedback module and configured to perform a discrete Fourier transform on the soft symbol feedback to yield precoded soft symbol feedback;
- a feedback weighting module connected to the DFT module and configured to weight the precoded soft symbol feedback to yield a weighted feedback signal;
- a feed-forward weighting module connected to the plurality of pre-processing modules and configured to weight the N-tone signals y to yield weighted feed-forward signals;
- a summing module configured to subtract the weighted feedback signals from the feed-forward weighted signals to yield feedback compensated signals; and
- an inverse discrete Fourier transform (IDFT) module configured to transfer the feedback compensated signals into the time domain to yield time domain signals,
- wherein the demodulator/decoder is further configured to demodulate and decode the bias compensated signals for the U layers.

16. The system of claim 15, wherein the N-tone signals y as are characterized by:

$$y = H^* \Gamma^* s + w,$$

where $$H = \begin{bmatrix} H_{0,0} & \cdots & \cdots & H_{0,U-1} \\ \vdots & \ddots & & \vdots \\ \vdots & & \ddots & \vdots \\ H_{M_r,0} & \cdots & \cdots & H_{M_r,U-1} \end{bmatrix}$$

$$H_{m,u} = \text{Diag}[h_{u,k}(m), (k=0, 1, \ldots, N-1)]$$

$$\Gamma = I_U \otimes F$$

$$s_u = [s_{0,u}, \ldots, s_{N-1,u}]^T$$

$$s = [s_0^T, \ldots, s_u^T, \ldots, s_{U-1}^T]^T$$

$$w = [w_0^T, \ldots, w_{M_r-1}^T]^T$$

$h_{u,k}(m)$ is a channel response from a transmitter sending a uth spatial stream to an mth receive antenna on a kth subcarrier
F is a N point DFT kernel,
w is a noise vector of length MrN, and
⊗ is a Kronecker product.

17. The system of claim 16, wherein the equalizer is configured to feed-forward weight the Mr N-tone signals using a $G_{u_m}^{(i)} N \times M_r N$ feed-forward matrix in the i-th iteration, for the $u_m$-th layer, weight the soft symbol feedback from U layers using a $B_{u_m}^{(i)} N \times UN$ feed-back matrix in the i-th iteration, for the $u_m$-th layer, and compensate for bias in the time domain signal using a N×N diagonal matrix $D_{u_m}^{(i)}$ to remove bias in the i-th iteration for the $u_m$-th layer.

18. The system of claim 17, wherein the equalizer is configured to use the $G_{u_m}^{(i)} N \times M_r N$ feed-forward matrix to minimize a mean square error (MSE) function per tone, wherein $G_{u_m}^{(i)}$ is characterized by:

$$G_{u_m}^{(i)} = [G_{u_m,0}^{(i)} G_{u_m,1}^{(i)} \ldots G_{u_m,M_r-1}^{(i)}]$$

wherein submatrices of $G_{u_m}^{(i)}$ are diagonal $$B_{u_m}^{(i)} = [B_{u_m,0}^{(i)} B_{u_m,1}^{(i)} \ldots B_{u_m,U-1}^{(i)}]$$

19. The system of claim 18, wherein using the $B_{u_m}^{(i)} N \times UN$ feed-back matrix comprises minimizing a MSE function per tone, wherein $B_{u_m}^{(i)}$ is characterized by:

$$B_{u_m}^{(i)} = [B_{u_m,0}^{(i)} B_{u_m,1}^{(i)} \ldots B_{u_m,U-1}^{(i)}]$$

wherein submatrices of $B_{u_m}^{(i)}$ are diagonal.

20. The system of claim 19, wherein the equalizer minimizes the MSE function based on:

$$J_{u,k}^{(i)} = E\left[\left| g_{u_m,k}^{(i)H} \tilde{y}_k - \sum_{l=0}^{m-1} b_{u_m,u_l,k}^{(i)} \hat{x}_{k,u_l}^{(i)} - \sum_{l=m}^{U-1} b_{u_m,u_l,k}^{(i)} \hat{x}_{k,u_l}^{(i-1)} - x_{k,u_m} \right|^2 \right]$$

with constraint $\sum_{k=0}^{N-1} b_{u_m,u_m,k}^{(i)} = 0$ where $$\tilde{y}_k = [y_{k,0}, \ldots, y_{k,M_r-1}]^T,$$

and $$x_v = F s_v, \hat{x}_v = F \hat{s}_v$$

where $$g_{u_m,k}^{(i)} = [G_{u_m,0}^{(i)}(k,k), \ldots, G_{u_m,M_r-1}^{(i)}(k,k)]^H$$

$$b_{u_m,u_l,k}^{(i)} = B_{u_m,u_l}^{(i)}(k,k)$$

and wherein a noise and interference covariance matrix $R_k$ is assumed to be known by the receiver, and where $$R_k(m,n) = E[w_m;(k) w_n(k)^*]$$

wherein $B_u^{(i)}$ and $G_u^{(i)}$ are computed based upon $R_k$.

21. The system of claim 20, wherein the equalizer is configured to optimize the feed-forward weighting according to:

$$g_{u_m,k}^{(i)H} = \rho_{u_m}^{(i)} \tilde{g}_{u_m,k}^{(i)H}$$

$$\tilde{g}_{u_m,k}^{(i)H} = h_{u_m,k}^H C_{u_m,k}^{(i)^{-1}}$$

$$\rho_{u_m}^{(i)} = \frac{E_{ss}}{1 + \beta_{u_m}^{(i-1)} E_{ss} T_{u_m}^{(i)}}$$

$$T_{u_m}^{(i)} = \frac{1}{N} \sum_{k=0}^{N-1} \tilde{g}_{u_m,k}^{(i)H} h_{u_m,k}$$

$$C_{u_m,k}^{(i)} = \sum_{l=0}^{m-1} E_{ss}\left(1 - \beta_{u_l}^{(i)}\right) h_{u_l,k} h_{u_l,k}^H + \sum_{l=m}^{U-1} E_{ss}\left(1 - \beta_{u_l}^{(i-1)}\right) h_{u_l,k} h_{u_l,k}^H + R_k$$

$$\beta_u^{(i)} = \frac{E_{s\tilde{s},u}^{(i)\,2}}{E_{\tilde{s}\tilde{s},u}^{(i)} E_{ss}}$$

wherein weighting of soft symbol feedback from the U layers is optimized according to:

$$b_{u_m,u_m,k}^{(i)} = \alpha_{u_m}^{(i-1)} \rho_{u_m}^{(i)} (\tilde{g}_{u_m,k}^{(i)H} h_{u_m,k} - T_{u_m}^{(i)})$$

$$b_{u_m,u_l,k}^{(i)} = \alpha_{u_l}^{(i)} g_{u_m,k}^{(i)H} h_{u_l,k}, \text{ for } l < m$$

$$b_{u_m,u_l,k}^{(i)} = \alpha_{u_l}^{(i-1)} g_{u_m,k}^{(i)H} h_{u_l,k}, \text{ for } l > m$$

$$\alpha_u^{(i)} = \frac{E_{s\tilde{s},u}^{(i)}}{E_{\tilde{s}\tilde{s},u}^{(i)}}$$

where $T_u^{(i)}$, $\alpha$, and $C_{u_m,k}^{(i)}$ are intermediate terms.

22. The system of claim 21, wherein the compensation module is configured to compensate for bias in the time domain signal by calculating $$BIAS = \rho_{u_m}^{(i)} T_{u_m}^{(i)}$$

$$MSE = E_{ss}(\rho_{u_m}^{(i)} T_{u_m}^{(i)} - 1)^2 - E_{ss}(1-\beta_{u_m}^{(i-1)})(\rho_{u_m}^{(i)} T_{u_m}^{(i)})^2 + \rho_{u_m}^{(i)} T_{u_m}^{(i)}$$

calculating a bias correction matrix $$D_{u_m}^{(i)} = \frac{1}{BIAS} I$$

and calculating a symbol-wise signal-to-noise ratio (SNR)

$$SNR = \frac{BIAS^2 E_{ss}}{MSE - (BIAS-1)^2 E_{ss}} = \frac{T_{u_m}^{(i)} E_{ss}}{1 - E_{ss}(1-\beta_{u_m}^{(i-1)}) T_{u_m}^{(i)}}$$

where I is an identity matrix.

23. The system of claim 13, wherein the demodulator/decoder is configured to supply soft symbols for the respective U layers by converting from bit-wise likelihood to symbol-wise likelihood according to:

$$\hat{s}_k = \sum_{k=0}^{M-1} Pr(s_k) s_k$$

$$Pr(s_k) = \prod_{j=0}^{log_2(M)-1} Pr(b_j(s_k)),$$

where M is a constellation size; and where $Pr(b_j(S_k))$ is a probability of a j-th bit being fed back from a soft symbol.

* * * * *